3,435,001
**METHOD FOR HYDROLYZING ORGANO-
CHLOROSILANES**
Duane F. Merrill, Ballston Spa, N.Y., assignor to General
  Electric Company, a corporation of New York
No Drawing. Filed Oct. 1, 1964, Ser. No. 400,924
Int. Cl. C08g *31/36*
U.S. Cl. 260—46.5                                5 Claims

ABSTRACT OF THE DISCLOSURE

A method is provided for controlling the hydrolysis of organohalosilanes and the production of various organopolysiloxane, involving the employment of a paste consisting essentially of water and a hydrophylic particulated inert material. Some of the organopolysiloxane has an average ratio of about one organo radical per silicon atom. In instances where organohalosilane is hydrolyzed having a ratio of about 2 organo radicals per silicon atom, relatively high molecular weight organopolysiloxane is obtained directly.

---

The present method relates to a method for hydrolyzing organochlorosilane in the presence of inert material having a high surface area and to certain organopolysiloxane products produced thereby.

It is generally known to those skilled in the organosilicon art, that hydrolysis of organochlorosilane included by the formula, (1) $(R)_aSiCl_{(4-a)}$ where R is selected from monovalent hydrocarbon radicals and halogenated monovalent hydrocarbon radicals, and $a$ is an integer equal to 1 to 3, inclusive, can result in a variety of organopolysiloxane hydrolyzate. Depending upon the ratio of R radicals to silicon in the hydrolyzate and the conditions employed during the hydrolysis of the organochlorosilane, products such as cyclics, linear polymers, useless gels, soluble resins, etc. can be produced.

Experience has shown that gelation is one of the principal problems of conventional organochlorosilane hydrolysis. Gelation of organopolysiloxane hydrolyzate can become significant when the ratio of R radicals to silicon of the hydrolyzate falls below 1.8. Another limitation of conventional organochlorosilane hydrolysis arises when diorganodihalosilane is hydrolyzed to make linear polydiorganosiloxane. Invariably, only low molecular weight polymers and cyclics are produced.

It has been found that gelation of organopolysiloxane hydrolyzate can be alleviated by partially alkoxylating the organochlorosilane with an aliphatic alcohol prior to hydrolysis. The hydrolysis of the resulting hydroxylated organochlorosilane can be controlled to a greater degree. Another method which can be employed to hydrolyze organochlorosilane included by Formula 1 to minimize gelation of the resulting hydrolyzate, is to hydrolyze the organochlorosilane in a large excess of water at reduced temperatures. This practice also has been found to provide for more controlled silanol condensation. A method that can be employed to make linear polydiorganosiloxane of high viscosity is taught by Wright Patent 2,452,416, assigned to the same assignee as the present invention.

Although the employment of such prior art methods of hydrolysis can be relied upon to reduce gelation of organopolysiloxane hydrolyzate, and provide for the production of linear polydiorganosiloxanes, these methods have inherent limitations. For example, in recovering organopolysiloxane hydrolyzate produced by the alkoxylation method having a ratio of R radicals to silicon of less than 1.8, the resin often retains residual chemically combined alkoxy radicals. As a result, the cure of the resin and strength of laminate made from the cured product can be impaired. In addition, although the method of Wright is effective, it requires the use of material such as hydrated inorganic salts, for example, copper hydroxide, ferric sulfate, sodium sulfate, etc. As a result, the polymer can readily be contaminated with metal ions which can limit its utility.

The term "organochlorosilane," as utilized hereinafter, as shown for example by Formula 1 includes organotrichlorosilane, diorganodichlorosilane, triorganochlorosilane, and mixtures thereof. Radicals included by R of Formula 1 are aryl radicals, and halogenated aryl radicals, such as phenyl, chlorophenyl, xylyl, tolyl, etc.; aralkyl radicals such as phenylethyl, benzyl, etc.; aliphatic, haloaliphatic, and cycloaliphatic, such as alkyl, alkenyl, cycloalkyl, haloalkyl, including methyl, ethyl, propyl, butyl, cyclohexyl, vinyl, allyl, etc.; cyanoalkyl such as cyanoethyl, cyanopropyl, cyanobutyl, etc.; fluoroalkyl such as fluoroethyl, trifluoropropyl, fluorobutyl, etc. Where R, as utilized hereinafter, can represent more than one radical, these radicals can be all the same, or they can represent any two or more of the aforementioned R radicals.

The present invention is based on the discovery that surprising results can be achieved by hydrolyzing organochlorosilane included by Formula 1, with a paste made from water, and inert hydrophylic particulated material having a high surface area. For example, organochlorosilane comprising up to 100 mole percent of methyltrichlorosilane, which normally forms a powder upon contact with water, can be hydrolyzed to an organic solvent soluble liquid by the method of the present invention. Another significant feature of the present invention is that organopolysiloxane hydrolyzate having a ratio of about 2 radicals per silicon atom, resulting from the hydrolysis of diorganodichlorosilane included by Formula 1, in accordance with the practice of the invention, can be made substantially free of cyclopolysiloxanes and at viscosities substantially higher than achieved by prior art methods.

There is provided by the present invention, a method for hydrolyzing organochlorosilane, included by Fomula 1, to provide for the production of organopolysiloxane hydrolyzate having the formula, (2) $$(R)_bSiO_{\frac{(4-b)}{2}}$$

which method comprises (1) agitating a hydrolysis mixture comprising said organochlorosilane an organic solvent and a paste consisting of water and a hydrophilic particulated inert material having a high surface area, and (2) recovering said organopolysiloxane hydrolyzate from (1), where said paste contains sufficient water to provide in said hydrolysis mixture from 0.5 to 5.0 moles of water per mole of chlorine attached to silicon by chlorine-silicon linkages, R is as defined above, and $b$ has a value between 1 to 2.2, inclusive.

The term "paste employed" in the description of the present invention can be more particularly defined as a dispersed system of water, or hydrochloric acid, and an inert hydrophylic particulated material. The inert particulated material can have a surface area between 0.02 $M^2/g$. and as high as 400 $M^2/g$.; it also is inert to the reactants or products produced during the hydrolysis of organohalosilane of Formula 1. The inert particulated material has an average particle size which is small enough to facilitate the agitation of the reactants during the hydrolysis of the organohalosilane. Preferably, the particle size of the inert hydrophylic particulated material is less than 100 microns, while a particle size from .01 micron to as high as 100 microns can be employed.

Suitable inert particulated materials include for example, diatomaceous earth, fumed silica, zeolite, silica aerogel, etc.

The paste can be made by mixing water, or hydrochloric acid, with the inert particulated material. Water can be added to the inert particulated material while it is agitated. The addition of water can be continued until the mixture changes from a paste of uniform consistency to a slurry having water visibly separated from the slurry. Experience has shown that optimum results can be achieved as long as the water is uniformly distributed throughout the mass of inert particulated material.

In the practice of the invention, the organochlorosilane is hydrolyzed in the presence of the paste, while the resulting mixture is agitated. Depending upon the functionality of the organochlorosilane, for example, organotrichlorosilane, diorganodihalosilane, mixtures of various chlorosilane having from 1 to 3 organo radicals attached to silicon as shown by Formula 1, etc. the conditions of the hydrolysis, such as temperature, amount of water, length of reaction time, etc. will vary.

For example, when hydrolyzing organochlorosilane consisting of at least 90 mole percent, based on moles of organochlorosilane of organotrichlorosilane, a temperature of between −30° C. to +95° C. can be employed. Preferably, a proportion of from stoichiometric to a 1.1 mole percent of water over organotrichlorosilane can be utilized. In particular situations, up to 1.5 parts of an organic solvent, per part of organochlorosilane also can be employed to facilitate agitation. Suitable organic solvents include for example, toluene, xylene, etc. Reaction times can vary between 30 minutes or less, to as long as 2 hours or more, depending upon the paste utilized, degree of agitation, etc. During the hydrolysis, recovery of hydrogen chloride can be achieved directly in a continuous manner; if desired it can be further purified by passing it into a scrubber, extraction column, etc. The separation of the resulting hydrolyzate (3) 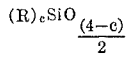

where R is defined above, and where $c$ has a value between 1 to about 1.1, can be achieved in accordance with conventional means such as by filtration of the inert particulated material from the hydrolysis mixture, and the stripping of the solvent from the hydrolyzate.

Hydrolysis of organochlorosilane consisting essentially of diorganodichlorosilane, or mixtures of various diorganodichlorosilanes, also can be effected at temperatures between −30° C. to 95° C.; a proportion of from 0.5 mole of water to 5.0 moles of water per mole of the organochlorosilane can be employed if desired.

Hydrolysis of the diorganodichlorosilane can be accomplished by adding it to the paste while it is agitated. Alternatively, water or hydrochloric acid can be added to a slurry of the diorganodichlorosilane and the inert particulated material. Experience has shown that optimum results can be achieved if the hydrolyzate consisting essentially of chemically combined diorganosiloxy units is refluxed at the termination of hydrolysis. During the hydrolysis and reflux stages, hydrogen chloride can be recovered and treated further if desired. Reflux times of from 1 to 6 hours at a temperature between 100° C. to 110° C. can be employed. The separation from the reaction mixture of linear polydiorganosiloxane substantially free of cyclopolysiloxane consisting essentially of chemically combined diorganosiloxy units of the formula, (4)         $(R)_2SiO$ where R is defined above, can be readily achieved. In addition, use of an organic solvent and standard procedures such as filtration, stripping, etc. can be employed to facilitate separation of hydrolyzate.

In order that those skilled in that are will be better able to practice the invention, the following examples are given by way of illustration and not by way of limitation. All parts are by weight.

Example 1

There were added 600 parts of methyltrichlorosilane to a paste of 27 parts of finely divided fumed silica, 118 parts of water and 540 parts of toluene. The addition of the methyltrichlorosilane lasted 20 minutes, during which time the mixture was continuously agitated. After the hydrolysis was completed, the mixture was filtered and the hydrolyzate was recovered. Residual hydrochloric acid was azeotroped from the hydrolysis until it tested neutral to litmus. There were obtained 135 parts of a methylpolysiloxane having a viscosity of about 600 centipoises at 25° C. The methylpolysiloxane turned to a thermoplastic solid after standing three hours at room-temperature. When the fluid methylpolysiloxane was refrigerated with liquid nitrogen, it was converted to a solid; it was found that after the methylpolysiloxane had been refrigerated 30 days with liquid nitrogen it formed a fluid when exposed to atmospheric conditions.

The following table shows additional properties of the methylpolysiloxane. In the table under "Methylpolysiloxane" various physical states of the methylpolysiloxane are listed. The physical states listed show ungelled methylpolysiloxane for the periods of time and temperatures indicated at the right. "Solid" shows that the methylpolysiloxane is a thermoplastic solid which can be melted on a hot plate, at about 170° C.–200° C., and remain a fluid for about five minutes before curing to a solid film; "50% solids" indicates the concentration of a solution of the methylpolysiloxane in toluene which can impart water repellency to a substrate when applied thereto and allowed to dry at 25° C.

| Methylpolysiloxane | 0° C. | 25° C. |
|---|---|---|
| Fluid | | 3 hrs. |
| Solid | 6 mos. | 30 days. |
| 50% solids | 1 yr. | 6 mos. |

In addition to the above properties, the methyl polysiloxane was found to be completely miscible with a variety of hydrocarbon solvents such as toluene, benzene, xylene, mineral spirits, etc.

Example 2

There were added 1000 parts of phenyltrichlorosilane to a paste of 1000 parts of water and 333 parts of finely divided diatomaceous earth having an average particle size of about 100 microns. The addition of the silane lasted 90 minutes. After 750 parts of phenyltrichlorosilane had been added, 200 parts of toluene also were added. The hydrolysis was performed at a temperature of between 45° C. to 100° C. The mixture was refluxed for one hour, resulting in the separation of an aqueous layer and a layer of phenylpolysiloxane hydrolyzate and finely divided diatomaceous earth. During the hydrolysis and reflux stages, hydrogen chloride was continuously evolved. An additional 200 parts of toluene were added and the refluxing was continued for two more hours at a temperature of about 92° C. An additional 400 parts of toluene were then added and the mixture was filtered. There were obtained 580 parts of a neutral phenylpolysiloxane resin after the toluene was stripped. The polymer was found to be soluble in benzene. A film was cast from a benzene solution of the resin at 30% solids by pouring the solution onto an aluminum substrate and allowing the toluene to evaporate.

Example 3

There were added over a period of 90 minutes, 1500 parts of diphenyldichlorosilane to a paste consisting of 750 parts of water and 250 parts of diatomaceous earth. During the addition, the temperature of the hydrolysis mixture was maintained between 70° C. to 100° C. After the addition, the mixture was refluxed for 4 hours at a temperature of between 100° C. to 110° C. Hydrogen chloride was continuously evolved during the addition of the diphenyldichlorosilane and subsequent reflux period. There were added 1500 parts of toluene and the mixture was filtered. The organic phase was washed with water. The resulting hydrolyzate was stripped to 250° C. at 10 mm. There were obtained 900 parts of a linear polydiphenylsiloxane based on its infrared spectrum and Zerwitnoff analysis. Its hydroxy content was found to be 1.8%. Based on its hydroxy content, the polymer was composed of on the average about 10 chemically combined diphenylsiloxy units.

Example 4

There were added 1224 parts of dimethyldichlorosilane and 276 parts of diphenyldichlorosilane to a paste of 250 parts of diatomaceous earth and 750 parts of water. During the addition of the chlorosilanes, the paste of water and diatomaceous earth was maintained at a temperature of 70 C. The addition of the chlorosilane was completed after 2½ hours while the temperature of the mixture was maintained between 70° C. and 95° C. Hydrogen chloride was continuously evolved during the addition of the chlorosilanes and until ½ hour after the addition was completed. The mixture was then refluxed for 4 hours at a temperature between 100 to 110° C. There were then added to the mixture 1500 parts of toluene, and the mixture was filtered. The solvent was then stripped to a temperature to 130° C. The hydrolyzate was then allowed to cool to room temperature and washed with water. Residual hydrogen chloride was removed from the hydrolyzate by azeotropic distillation. The neutral hydrolyzate was then further stripped of volatiles to 250° C. There were obtained 810 parts of product having a viscosity of 8,000 centipoises at 25° C. Based on its infrared spectrum, it was a linear copolymer composed of about 10 mole percent of chemically combined diphenylsiloxy units and 90 mole percent of dimethylsiloxy units.

Example 5

Dimethyldichlorosilane was added to a paste of water and diatomaceous earth. The resulting mixture consisted of equal parts by weight of dimethyldichlorosilane and water and an amount of diatomaceous earth that was about ⅓ of the weight of water. The addition of the dimethyldichlorosilane lasted 2 hours and the temperature was maintained between 45° C. to 90° C. During the addition, hydrogen chloride was continuously evolved. The mixture was then agitated for an additional 3 hours and heated to 90° C. An amount of toluene equal to the weight of dimethyldichlorosilane initially hydrolyzed was then added to the mixture. The mixture was agitated for 15 minutes and the organic phase was recovered and filtered. A portion of the product was recovered by distillation and vacuum stripping under reduced pressure. The residual stripped product was washed further with water. A linear polydimethylsiloxane was obtained having a viscosity of about 4,000 centipoises at 25° C. and a silanol content of about 0.9%. Based on the weight of starting reactant the yield of linear polydimethylsiloxane was about 87%.

A one package room temperature vulcanizing organopolysiloxane composition was made with the above-described silanol chain-stopped polydimethylsiloxane. The procedure employed is described in the application of M. D. Beers, Ser. No. 312,011 filed Sept. 27, 1963, now Patent No. 3,382,205 and assigned to the same assignee as the present invention. There was utilized 100 parts of the silanol chain-stopped polydimethylsiloxane, 21 parts of fumed silica filler, 5 parts of methyltriacetoxysilane and 0.1 part of dibutyltindilaurate. Slabs made from the resulting organopolysiloxane composition were evaluated. The cured slabs were found to have a hardness of 43 (Shore A), a tensile of 300 (p.s.i.) and an elongation (percent) of 200.

Example 6

There were added slowly to a mixture of 2000 parts of dimethyldichlorosilane and 333 parts of diatomaceous earth, 175 parts of water at a temperature of about 30° C. The addition lasted about 1 hour and 40 minutes. Hydrogen chloride was continuously evolved during the course of the hydrolysis which was conducted at −5° C. The mixture was then refluxed for 3 hours. There was obtained a 78% yield of a silanol chain-stopped polydimethylsiloxane having a viscosity of about 100 centipoises at 25° C.

Example 7

The procedure of Example 1 was repeated except that in place of methyltrichlorosilane, there was utilized a mixture of methylchlorosilane comprised of about 90 mole percent of methyltrichlorosilane and about 10 mole percent of dimethyldichlorosilane. A fluid product was obtained. Based on its infrared spectrum it consisted essentially of chemically combined methylsiloxy units and a minor amount of chemically combined dimethylsiloxy units. Its properties were similar to the fluid methylpolysiloxane of Example 1.

Based on the data shown in the above examples, those skilled in the art would know that the method of the present invention provides for significantly improved advantages and surprising results over prior art methods of hydrolysis. For example, prior to the present invention, hydrolysis of methyltrichlorosilane invariably resulted in a gel or even a finely divided powder as shown in Patent 2,676,091, Barry et al. However, as shown above by Example 1 of the present invention, hydrolysis of methyltrichlorosilane provides for the production of a methylpolysiloxane which is miscible in various hydrocarbon solvents in all proportions. In addition, the method of the present invention provides for the ready recovery of hydrogen chloride resulting from the hydrolysis of organochlorosilane of Formula 1. A further advantage of the present invention also is shown by the examples with respect to the production of a variety of valuable organopolysiloxane materials such as polymers and copolymers containing chemically combined diorganosiloxy units. The present invention provides for the production of linear polydiorganosilanes by directly hydrolyzing diorganodihalosilane, while minimizing the production of cyclopolydiorganosiloxanes.

While the foregoing examples have of necessity been limited to only a few of the very many variables within the scope of the present invention, it should be understood that the present invention covers a much broader class of organopolysiloxane compositions which can be produced by hydrolyzing organochlorosilanes of Formula 1 by the method of the present invention. In addition, the method of the present invention is also directed to the employment of a variety of other materials in addition to those shown in the examples such as zeolite and silica aerogel as well as a variety of other operating conditions such as temperature, proportions of water and inert hydrophylic material, etc.

What I claim as new and desire to secure by Letters Patent of the United States is:

1. A method which comprises hydrolyzing organochlorosilane included by the formula,

comprising at least 90 mole percent, based on the weight of said organochlorosilane of organotrichlorosilane comprising the steps of (1) agitating at a temperature between −30° C. to 95° C., a mixture comprising said organochlorosilane, a hydrocarbon solvent and a paste consisting of water and hydrophylic particulated inert material having a surface area between 0.02 M²/g. to 400 M²/g. and a particle size in the range of from 0.01 micron to 1,000 microns, and (2) recovering from (1) an organopolysiloxane hydrolyzate having the formula, $$(R)_c SiO_{\frac{(4-c)}{2}}$$

where said paste contains sufficient water to provide in said hydrolysis mixture, from 1 to 1.1 moles of water per mole of chlorine attached to silicon by chlorine silicon linkages, $a$ is an integer equal to from 1 to 3, inclusive, R is selected from the class consisting of monovalent hydrocarbon radicals and halogenated monovalent hydrocarbon radicals, and $c$ has a value between 1 to about 1.1.

2. A method which comprises hydrolyzing organochlorosilane included by the formula $$(R)_a SiCl_{(4-a)}$$

consisting essentially of diorganodihalosilane of the formula $$R_2 SiCl_2$$

which comprises the steps of (1) agitating at a temperature between −30° C. to 95° C., a hydrolysis mixture comprising said organochlorosilane, a hydrocarbon solvent and a paste consisting of water and a hydrophylic particulated inert material having a surface area between 0.02 M²/g. to 400 M²/g. and a particle size in the range of from 0.01 micron to 1,000 microns, and (2) recovering organopolysiloxane hydrolyzate from (1) consisting essentially of chemically combined $R_2SiO$ units, where said paste contains sufficient water to provide in said hydrolysis mixture from 0.5 to 5 moles of water, per mole of chlorine attached to silicon by chlorine-silicon linkages, $a$ is an integer equal to from 1 to 3, inclusive, and R is a member selected from the class consisting of monovalent hydrocarbon radicals and halogenated monovalent hydrocarbon radicals.

3. A method which comprises (1) agitating at a temperature between −30° C. to 95° C., a hydrolysis mixture comprising methyltrichlorosilane, toluene and a paste consisting of water and a diatomaceous earth having a surface area of at least 0.02 M²/g. and (2) recovering a liquid methylpolysiloxane hydrolyzate from (1), where said paste contains sufficient water to provide said hydrolysis mixture from about 1 to 1.1 moles of water per mole of chlorine attached to silicon by chlorine-silicon linkages.

4. A method which comprises (1) agitating at a temperature between −30° C. to 95° C., a hydrolysis mixture comprising dimethyldichlorosilane, toluene and a paste consisting of water and a diatomaceous earth having a surface area of at least 0.02 M²/g., and (2) recovering a linear dimethylpolysiloxane hydrolyzate from (1), where said paste contains sufficient water to provide in said hydrolysis mixture from 0.5 to 5 moles of water per mole of chlorine attached to silicon by chlorine-silicon linkages.

5. A method which comprises hydrolyzing organochlorosilane selected from the class consisting of organotrichlorosilane and diorganodichlorosilane to provide for the production of organopolysiloxane hydrolyzate comprising the steps of (1) agitating a hydrolysis mixture comprising said organochlorosilane, an organic solvent and a paste consisting of water and hydrophylic particulated inert material having a surface area between 0.02 M²/g. to 400 M²/g. and a particle size in the range of from 0.01 micron to 1,000 microns, and (2) recovering said organopolysiloxane hydrolyzate from (1), where said paste contains sufficient water to provide in said hydrolysis mixture from 0.5 to 5.0 moles of water per mole of chlorine attached to silicon by chlorine-silicon linkages, and where the organo radicals of said organochlorosilanes are selected from the class consisting of monovalent hydrocarbon radicals and halogenated monovalent hydrocarbon radicals.

References Cited

UNITED STATES PATENTS

| 2,452,254 | 10/1948 | McGregor et al. | 260—448.2 |
| 2,452,416 | 10/1948 | Wright | 260—448.2 |
| 2,460,805 | 2/1949 | Britton | 260—46.5 |
| 2,588,366 | 3/1952 | Dennett | 260—46.5 |
| 3,090,765 | 5/1963 | Nitzsche et al. | 260—46.5 |
| 3,122,520 | 2/1964 | Lentz | 260—46.5 |
| 3,208,972 | 9/1965 | Lyons | 260—46.5 |

OTHER REFERENCES

Iler: "The Colloid Chemistry of Silica and Silicates," p. 130, Cornell University Press, Ithaca, N.Y., 1955.

Fordham: "Silicones," George Dewnes, Ltd., Strand, England, pp. 161 to 164, 1960.

DONALD E. CZAJA, *Primary Examiner.*

M. I. MARQUIS, *Assistant Examiner.*

117—135.1; 260—37, 18, 448.2